(12) United States Patent
Stolk et al.

(10) Patent No.: US 9,918,578 B2
(45) Date of Patent: Mar. 20, 2018

(54) CITRUS FRUIT PRESSING DEVICE AND METHOD FOR PRESSING JUICE FROM A PIECE OF CITRUS FRUIT

(71) Applicant: KONINKLIJKE PHILIPS N.V., Eindhoven (NL)

(72) Inventors: Theodoor Stolk, Eindhoven (NL); Klaas Kooijker, Eindhoven (NL); Petrus Johannes Nicolaas Bernardus Vreijsen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 395 days.

(21) Appl. No.: 14/441,553

(22) PCT Filed: Oct. 31, 2013

(86) PCT No.: PCT/IB2013/059819
§ 371 (c)(1),
(2) Date: May 8, 2015

(87) PCT Pub. No.: WO2014/072893
PCT Pub. Date: May 15, 2014

(65) Prior Publication Data
US 2015/0305540 A1    Oct. 29, 2015

(30) Foreign Application Priority Data

Nov. 12, 2012  (EP) .................................... 12192162

(51) Int. Cl.
*A47J 19/02*  (2006.01)
*B30B 15/08*  (2006.01)
(Continued)

(52) U.S. Cl.
CPC .............. *A47J 19/02* (2013.01); *A23N 1/003* (2013.01); *A23N 1/02* (2013.01); *B30B 9/3082* (2013.01); *B30B 13/00* (2013.01); *B30B 15/08* (2013.01)

(58) Field of Classification Search
CPC ......... B30B 1/06; B30B 15/08; B30B 9/3082; B30B 13/00; A47J 19/02; A47J 19/022;
(Continued)

(56) References Cited

U.S. PATENT DOCUMENTS 1,180,959 A   4/1916  Turner
2,454,256 A   1/1945  Myers
(Continued)

FOREIGN PATENT DOCUMENTS

FR    2912632 A1    8/2008
GB    2216784 A    10/1989
(Continued)

*Primary Examiner* — Jimmy T Nguyen

(57) ABSTRACT

A citrus fruit pressing device comprises two pressing elements for performing a pressing action on a piece of citrus fruit, The pressing elements have surfaces for contacting different sides of a piece of citrus fruit to be pressed and are movable with respect to each other in two opposite directions, i.e. towards and away from each other. The pressing device also comprises at least one knife for performing a cutting action on a piece of citrus fruit, through the peel of the piece The at least one knife is arranged at a side position with respect to the surface of the pressing elements for penetrating into the piece from a side which is free from contact to the surfaces of the pressing elements. The at least one knife is arranged at a side position with respect to the surfaces of the pressing elements.

12 Claims, 4 Drawing Sheets

(51) Int. Cl.
   *A23N 1/02* (2006.01)
   *A23N 1/00* (2006.01)
   *B30B 13/00* (2006.01)
   *B30B 9/30* (2006.01)

(58) Field of Classification Search
   CPC .... A47J 19/06; Y10T 74/18216; A23N 1/003; A23N 1/02; A23N 1/00
   USPC .......... 100/37, 98 R, 226, 238, 213; 99/495, 99/509, 510
   See application file for complete search history.

(56) References Cited

U.S. PATENT DOCUMENTS

| | | | | |
|---|---|---|---|---|
| 5,199,348 | A | * | 4/1993 | Cimenti ................ A23N 1/003 100/125 |
| 5,628,247 | A | * | 5/1997 | Palumbo ............... A23N 1/003 100/121 |
| 2012/0085248 | A1 | * | 4/2012 | Lin ........................ A47J 19/02 99/501 |

FOREIGN PATENT DOCUMENTS

| | | |
|---|---|---|
| GB | 2453349 A | 4/2009 |
| WO | 2012107771 A1 | 9/2012 |

* cited by examiner

CITRUS FRUIT PRESSING DEVICE AND METHOD FOR PRESSING JUICE FROM A PIECE OF CITRUS FRUIT

This application is the U.S. National Phase application under 35 U.S.C. § 371 of International Application No. PCT/IB2013/059819, filed on Oct. 31, 2013, which claims the benefit of International Application No. 12192162.1 filed on Nov. 12, 2012. These applications are hereby incorporated by reference herein.

FIELD OF THE INVENTION

The present invention relates to a citrus fruit pressing device, comprising: two pressing elements for performing a pressing action on a piece of citrus fruit, which pressing elements have surfaces for contacting different sides of a piece of citrus fruit to be pressed, and which pressing elements are movable with respect to each other in two opposite directions, i.e. towards each other and away from each other, and cutting means for performing a cutting action on a piece of citrus fruit, through the peel of the piece.

The present invention also relates to a method for pressing juice from a piece of citrus fruit, wherein two opposite pressing surfaces which are movable towards each other and away from each other are provided, wherein the piece is arranged between the pressing surfaces, wherein at least one cut is made in the piece, through the peel of the piece, and wherein the piece is pressed as a whole by moving the pressing surfaces towards each other.

BACKGROUND OF THE INVENTION

Well-known examples of citrus fruit are oranges, lemons, limes and grapefruit. Citrus fruit is eaten fresh, pressed for juice, or preserved in marmalades, for example. The present invention provides solutions in the field of pressing juice from citrus fruit. Various types of citrus fruit pressing devices are known, wherein the devices range from hand-operated devices comprising a convex pressing surface surrounded by a channel for receiving juice from pre-cut halve pieces of citrus fruit to fully automated devices which are adapted to extract juice from citrus fruit without human intervention.

Pressing citrus fruit by hand is a rather bothersome job. An additional disadvantage of the process is that it is practically impossible for a user of the hand-operated device to keep his/her hands clean. Also, the device which is used in the process is quite difficult to clean, particularly a ring-shaped sieve which is part of the device and which is used for covering the channel and receiving pulp. It is a fact that juice from citrus fruits, especially orange juice, is very much appreciated by consumers. Orange juice has a sweet taste and is known for being healthy, containing a considerable quantity of vitamin C. However, due to the disadvantages as mentioned, people often decide to refrain from making the juice when they actually would like to do so, especially when there is not too much time, which may be the case at breakfast time in the morning during working days, for example.

In order to facilitate the task of pressing halve pieces of citrus fruit on the pressing surface, semi-automated citrus fruit pressing devices have been developed. In such devices, an element comprising the pressing surface is automatically rotated when a user presses down a halve piece of citrus fruit on the element. As a result, making juice from citrus fruit requires less effort from a user, but a user is still compelled to perform various actions, including extensive cleaning actions after use of a semi-automated device.

Fully automated devices are adapted to process whole pieces of citrus fruit. In particular, the devices are adapted to cut the pieces of citrus fruit in half, press the halve pieces of citrus fruit against a pressing surface, collect the juice which is obtained in this way, and discharge the juice to a receptacle such as a glass. Fully automated devices are very easy to use, but they are not suitable for domestic use due to their large size. Also, the devices comprise a lot of parts and require a lot of work when it comes to cleaning. An example of fully automated devices is found in GB 2 216 784 A.

A device which is adapted to perform an automatic pressing action on citrus fruit and which can be small enough for being used in a normal kitchen is known from WO 2012107771 A1. Among other things, the known device comprises a press means, an infeed means, a waste receptacle and a motor. The press means includes two portions, namely a ram portion and an extracting portion located a spaced distance apart from each other inside a housing of the device. The ram portion and the extracting portion are located along the same axis, so that pressing one or more articles inside the device can be realized by positioning the articles between the ram portion and the extracting portion and moving the ram portion towards the extracting portion.

The movement of the ram portion is driven by the electric motor which is also located inside the housing. The extracting portion includes a blade means for cutting the article to provide an outlet for the juice and a channel to transport the juice away from the pressed article. The force of the press means typically expels the juice from the article. A number of blade means may be provided in order to have a number of channels.

Pressing whole pieces of citrus fruit in a relatively small device would not be so much of a challenge if it was not for the fact that the peel of the citrus fruit contains oil which should not be mixed with the juice, as the oil ruins the sweet taste of the juice. Although the device known from WO 2012107771 A1 appears to function in practice, it has been found that oil is often released from the peel in such quantity that the taste of the juice is not acceptable. A reason for this effect is found in the fact that at a certain stage of a pressing action, the peel which is punctured by the blade means rips at various places close to the blade means, due to the deformation of the piece of citrus fruit and the forces acting on the peel, as a result of which oil is released, which mixes with the juice and is discharged through the blade means along with the juice.

SUMMARY OF THE INVENTION

It is an object of the present invention to provide a citrus pressing device which is easy to use and easy to clean, which is capable of reliably yielding juice with a sweet taste as desired, which is of a relatively simple yet robust design, and which can be small enough to be used on a normal kitchen top. The object as mentioned is achieved by means of a citrus fruit pressing device, comprising: two pressing elements for performing a pressing action on a piece of citrus fruit, which pressing elements have surfaces for contacting different sides of a piece of citrus fruit to be pressed, and which pressing elements are movable with respect to each other in two opposite directions, i.e. towards each other and away from each other, and cutting means for performing a cutting action on a piece of citrus fruit, through the peel of the piece, which cutting means are arranged for penetrating into the piece from a side which is free from contact to the surfaces of the pressing elements.

In the device according to the present invention, the surfaces of the pressing elements as mentioned are designed to be used for exerting a pressing force on a whole piece of citrus fruit. For that reason, the surfaces will hereinafter be referred to as pressing surfaces. According to one notable aspect of the present invention, pieces of citrus fruit to be pressed are cut at a position which is not only at the pressing surfaces, or not at all at the pressing surfaces. In particular, the cutting means of the device are arranged for penetrating into a piece of citrus fruit from a side which is free from contact to the pressing surfaces. In other words, the cutting means are arranged such as to realize a cutting action alongside a pressing movement of the pressing surfaces with respect to each other.

The cutting action of the cutting means on a piece of citrus fruit is automatically performed when the piece is pressed between the pressing surfaces, as the knife is located in an area where the piece expands in a sideward direction as a result of a pressing action. An advantage of the location of the cutting means as mentioned is that a defined cut is made in a piece of citrus fruit on the one hand, while the chance that ripping of the peel takes place at some point during a pressing action is minimized. The peel is not weakened at the location of contact to the pressing surfaces, but at the side where large deformations can be expected during a pressing action. Moreover, having cutting means outside of the pressing surfaces offers a possibility of collecting the juice directly from at least one cut in a piece of citrus fruit, wherein there is no need for a complex construction for making channels through one of the pressing surfaces as known from WO 2012107771 A1.

According to the present invention, it is advantageous to press juice from whole pieces of citrus fruit, wherein at least one knife is used to penetrate the pieces, through the peel. In this respect, it is noted that the pieces of citrus fruit do not need to be cut in a number of separate portions, so that it is sufficient for the knife to only penetrate the pieces. As mentioned in the foregoing, the peel contains oil which can spoil the taste of the juice. However, is has been found that when a defined cut is made through the peel, only a minimum quantity of oil is released, with no notable influence on the taste of the juice, contrary to a quantity of oil which is released when the peel rips. Hence, if measures are taken for avoiding that the peel rips, it is ensured that juice only passes the peel at a location of a defined cut, so that pressing actions can always be successful in that sweet juice is obtained.

In respect of pressing whole pieces of citrus fruit, it is noted that a general advantage of such a process is that pulp is kept inside the pieces, so that there is no need for the pressing device to comprise means for receiving pulp, which adds to simplicity of design.

In a practical embodiment, the device according to the present invention comprises a generally cylinder-shaped pressing chamber having an interior space for receiving a piece of citrus fruit to be pressed, which pressing chamber is partially delimited by the pressing surfaces, wherein one pressing surface constitutes one end surface of the pressing chamber, wherein another pressing surface comprises an opposite end surface of the pressing chamber, and wherein the cutting means comprise at least one knife which is arranged inside the pressing chamber on a side surface of the pressing chamber.

Preferably, the cutting means are located at a side of the pressing chamber which is a bottom side in an operational orientation of the device. For example, the cutting means may comprise two knives which are arranged in a lower half of the pressing chamber. In that way, it is realized that a piece of citrus fruit is provided with cuts at a bottom side, so that when the pressing action takes place, juice which is squeezed from the piece is directly or almost directly in a position for dripping from the orange, so that the extent to which the juice is allowed to contact the peel is minimal. Furthermore, juice can simply be received at the bottom side of the pressing chamber, as a result of which there is no need for complex means for discharging the juice from the pressing chamber.

It is possible for the at least one knife of the cutting means to comprise a straight cutting blade. It has been found that by making one, two or three straight cuts through the peel and a portion of the pulp of the piece of citrus fruit which is present behind the peel, with a length of half the periphery of the piece, for example, it is possible to press the piece to such an extent that a maximum quantity of juice is obtained without ripping the skin during the deformation of the piece. In a practical situation, two straight cuts can be made in a lower half of a piece of citrus fruit as arranged inside the pressing space, wherein the cuts are at different positions along the periphery of the piece. It is noted that the knife may have a constant height along its length, but this is not necessary within the framework of the present invention, as it may also be so that a cutting edge of the knife has an inclined orientation with respect to a base of the knife. Actually, within the framework of the present invention, the knife can have any design which is adapted to realize a cut in a piece of citrus fruit of desired shape and dimensions. For example, the knife may comprise two portions, wherein cutting edges of the portions are perpendicular with respect to each other, whereby a deep cut can be realized. In such an embodiment of the knife, one of the portions of the knife may be arranged on one of the pressing surfaces.

The cutting blade of the knife may extend in a direction which is substantially the same as the directions in which the pressing elements are movable with respect to each other. In that way, it is ensured that at least one cut is made in a piece of citrus fruit as it is pressed between the pressing surfaces which is capable of releasing the pressure in the peel in such a way that ripping of the peel is avoided. The cut is effective in doing so when the cut extends in the direction in which the pressing action is performed. Hence, on the basis of the presence of the cut in the peel, a situation in which the elasticity of the peel is exceeded is avoided, so that ripping of the peel is avoided. In respect of the chance that the peel will rip anyway in practical cases, it is noted that if this occurs, indeed, it is likely that this only happens near the end of the pressing action, when actually all the juice has already been squeezed from the piece of citrus fruit. Hence, a situation in which oil from the peel is mixed with the juice is avoided anyway, due to the fact that if ripping occurs, it takes place at a late stage of a pressing action.

It is noted that in a practical case, the directions in which the pressing elements are movable with respect to each other coincide with a direction in which a longitudinal axis of the cylinder shape of the pressing chamber extends. The pressing chamber may be shaped like a straight cylinder having a circular periphery, wherein a diameter of the cylinder is adapted to a general diameter of the pieces of citrus fruit to be pressed, and wherein a length of the cylinder is also adapted to the general diameter of the pieces of citrus fruit to be pressed, so that the pressing chamber is capable of freely receiving the pieces of citrus fruit prior to a pressing action. At the start of a pressing action, a distance between the opposite end surfaces of the pressing chamber is at a maximum, whereas at the end of a pressing action, the distance as mentioned is considerably smaller. At least one of the pressing elements may comprise at least one recess for allowing the pressing element to move over the knife, so that the mutual movement of the pressing elements is not hindered by the presence of the knife, while there is no need for relatively complex measures such as measures aimed at retracting the knife at a certain point.

It is practical if a position of one of the pressing elements is fixed in the directions in which the pressing elements are movable with respect to each other, wherein the surface on which the at least one knife of the cutting means is arranged is part of that one of the pressing elements. In such a case, the relative movement of the pressing surfaces which is used for performing a pressing action on a piece of citrus fruit is realized by moving only one pressing element, which is less complex than having two movably arranged pressing elements and moving both pressing elements.

In order to have automated functioning of the citrus fruit pressing device according to the present invention, it is practical for the device to comprise driving means for engaging with at least one of the pressing elements and moving the at least one of the pressing elements in the directions for changing the size of a space as present between the pressing elements when being activated. For example, the driving means may comprise an electromotor and means such as a spindle drive for connecting the at least one of the pressing elements to an outgoing shaft of the motor.

One of the pressing elements may have an opening for allowing a piece of citrus fruit to pass from outside the pressing element to inside the pressing element, i.e. inside the pressing chamber, and vice versa, wherein the pressing element may furthermore be rotatably arranged in the device. In a practical situation, the opening in the pressing element concerned is located in such a way as to provide access to the pressing chamber in a direction which is more or less perpendicular to the directions in which the pressing surfaces are movable with respect to each other. In particular, it is advantageous if the pressing element is rotatable about an axis extending in a direction which is substantially the same as the directions in which the pressing elements are movable with respect to each other. Preferably, in case a position of one of the pressing elements is fixed in the directions in which the pressing elements are movable with respect to each other, as mentioned in the foregoing, that one of the pressing elements is also the one of the pressing elements which has an opening for receiving a piece of citrus fruit and which is rotatably arranged in the device.

Suitable feeding means such as a feeding tube for feeding a piece of citrus fruit to the pressing chamber through the opening in the pressing element may be arranged at a level above the pressing chamber, so that supply of pieces of citrus fruit can simply take place under the influence of gravity. With a rotatable arrangement of the pressing element, it is possible to have a first position of the pressing element in which the opening is at the end of the feeding means, so that a piece of citrus fruit is allowed to fall into the pressing chamber, and a second position of the pressing element in which the opening is at a bottom side, so that a piece of citrus fruit which has been subjected to a pressing action is allowed to exit the pressing chamber under the influence of gravity. Optionally, it is also possible to rotate the pressing element along a short angular distance after a piece of citrus fruit to be pressed has been supplied to the pressing chamber, in order to prevent another piece of citrus fruit from passing through the opening and entering the pressing chamber as well. Another option is to have separate means at the opening for blocking and unblocking the opening.

In case the citrus fruit pressing device according to the present invention is equipped with a rotatably arranged pressing element as mentioned, it is preferred to have separate driving means for engaging with the pressing element and rotating the pressing element when being activated. These separate driving means may comprise a low power electromotor as hardly any force is involved in rotating the pressing element, compared to the forces needed in a pressing action. Hence, costs of the separate driving means can be relatively low.

In order to promote discharge of juice from the pressing chamber, it is advantageous if a surface of the pressing chamber which is at a side of the pressing chamber which is a bottom side in an operational orientation of the device has an inclined orientation with respect to the horizontal in the operational orientation of the device. In that case, the juice automatically flows to a defined location of the pressing chamber under the influence of gravity. Needless to say that it is most practical for the pressing chamber to be provided with a discharge opening at that location.

In order to limit the extent to which the peel of a piece of citrus fruit is deformed during a pressing action, it is preferred for the pressing surfaces to have complementary curved shapes. Advantageously, one of the pressing surfaces has a generally concave shape, whereas another of the pressing surfaces has a generally convex shape. The shapes of the pressing surfaces are another factor in avoiding ripping of the peel of a piece of citrus fruit during a pressing action. When the pressing surfaces are concave and convex as mentioned, the concave surface can be used for fully supporting a whole piece of citrus fruit in view of the fact that such a piece has a generally round/convex shape, while the convex surface can be used for pressing an opposite side of the piece in the direction of the supported side. In such a case, deformation of the peel is much less than in case the piece of citrus fruit would be pressed between two planar surfaces, for example. In fact, the piece of citrus fruit is essentially pressed into itself, as it were, so that there is no need for the peel to expand in diameter at all.

Within the framework of the present invention, it is proposed to have one pressing surface with a generally convex shape as mentioned, and a concave central portion, and to have another pressing surface with a generally concave shape as mentioned, and a convex central portion. In that way, the curvature of the surfaces is flipped in the center, which helps in preventing thick peels from ripping, as a large curve length difference between two sides of a piece of citrus fruit to be pressed is prevented.

The above-described and other aspects of the present invention will be apparent from and elucidated with reference to the following detailed description of a pressing device which is especially suitable to be used for pressing oranges, and components of the device and their functions.

BRIEF DESCRIPTION OF THE DRAWINGS

The present invention will now be explained in greater detail with reference to the figures, in which equal or similar parts are indicated by the same reference signs, and in which.

DETAILED DESCRIPTION OF EMBODIMENTS

Figure 1:
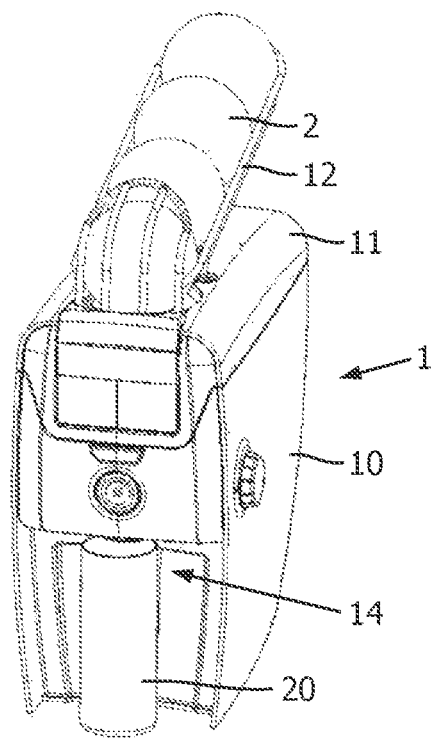
FIG. 1 shows a perspective view of a pressing device according to the present invention, in an operational orientation, a number of oranges as present in a holder on top of the device, and a glass as positioned at an outlet of the device.
Figure 2:
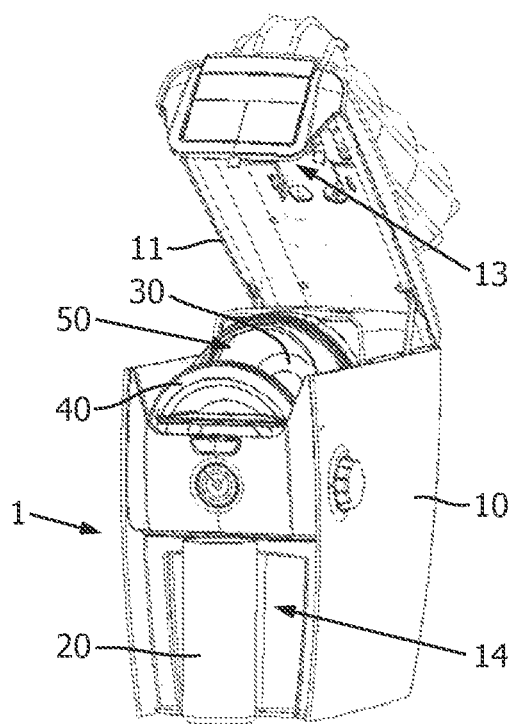
FIG. 2 shows a perspective view of the pressing device, the oranges and the glass as shown in FIG. 1, with a lid of the pressing device in an opened position.
Figure 3:
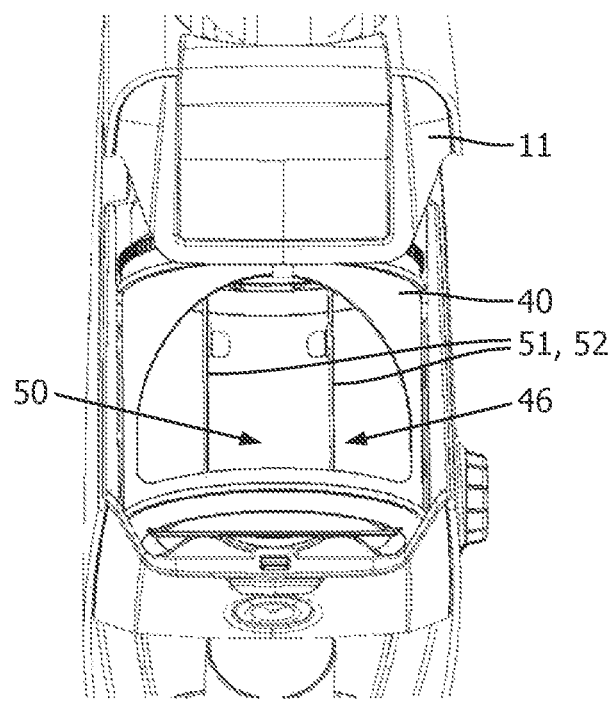
FIG. 3 shows a perspective view of an interior of the pressing device, as seen from a top side, wherein two pressing elements which are present in the interior of the pressing device can be seen.
Figure 4:
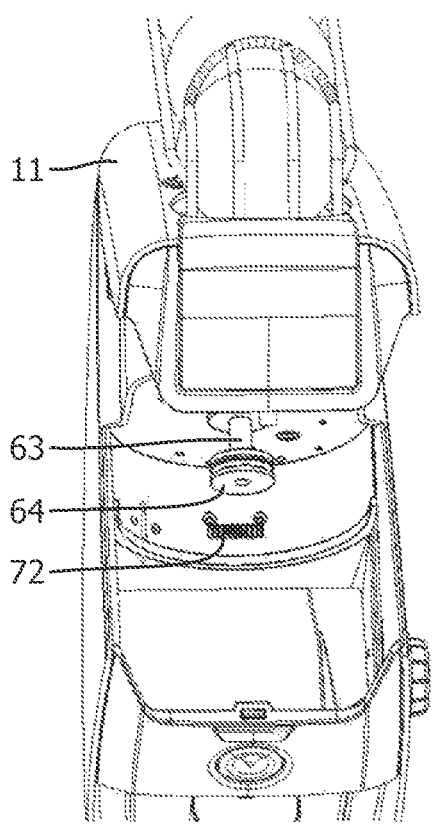
FIG. 4 shows a perspective view of the interior of the pressing device as shown in FIG. 3, with the pressing elements removed.

FIGS. 1 and 2 show a pressing device 1 according to the present invention, which is especially suitable for pressing oranges 2 in order to obtain juice from the oranges 2. The pressing device 1 comprises a housing 10 for accommodating components of the device 1 which are involved in performing a pressing action during operation of the device 1 as will be explained later on. A portion 11 of the housing 10 which is present at a side of the pressing device 1 which is a top side in a normal operational orientation of the device 1, which is the orientation of the device 1 as shown in the figures, constitutes a lid 11 which is hingably arranged so as to assume one of a closed position as shown in FIG. 1 and an opened position as shown in FIG. 2. In the opened position of the lid 11, an interior of the pressing device 1 is exposed, as can be seen in FIGS. 3 and 4. For sake of completeness, it is noted that all references to orientations and/or locations of components of the pressing device 1 in this text should be understood in the context of the operational orientation of the pressing device 1.

The pressing device 1 comprises a holder 12 for holding a number of oranges 2, which is located on top of the lid 11. Due to the presence of the holder 12, it is possible to press a number of oranges 2 one after another without a user of the pressing device 1 being compelled to supply the oranges 2 one by one. Preferably, the holder 12 has an inclined orientation with respect to the horizontal, so that a supply of oranges 2 can automatically take place under the influence of gravity. This is advantageous in view of the fact that the pressing device 1 according to the present invention is especially intended for domestic use, wherein it is not only preferred to have small dimensions, but also to have simple and reliable constructions. A lowest end of the holder 12 is at a location above an opening 13 in the housing 10 for allowing an orange 2 to move to the interior of the pressing device 1.

In the shown example, the housing 10 is provided with a recessed portion 14 for partially accommodating a glass 20 or another receptacle for receiving orange juice from the pressing device 1. At a top side of the recessed portion 14, an outlet of the pressing device 1 is present for allowing juice to flow from the interior of the device 1 to outside the device 1.

Figure 8:
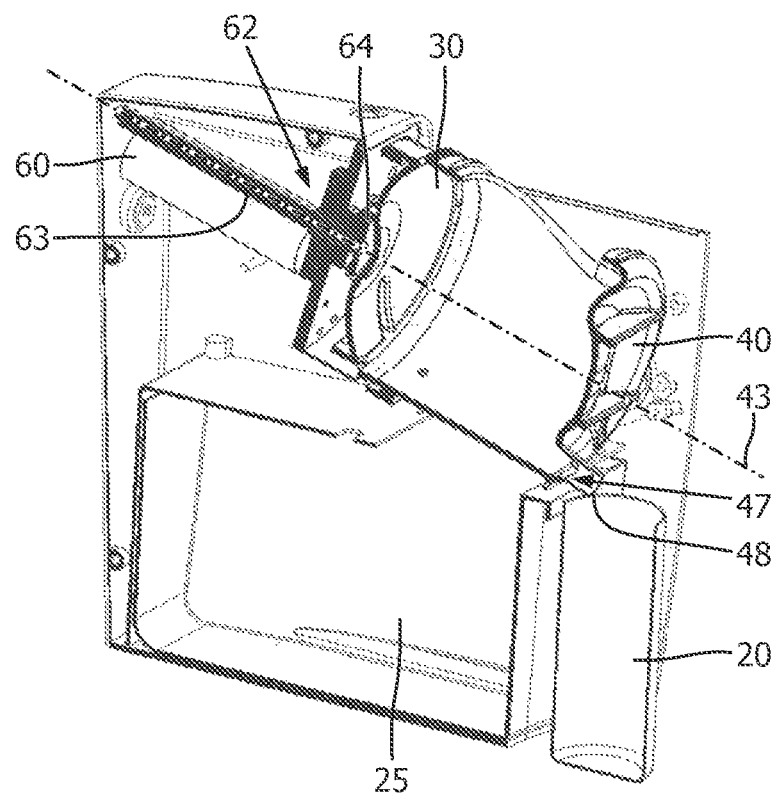
FIG. 8 diagrammatically shows a sectional view of the components of the pressing device as shown in FIG. 7.

Furthermore, the pressing device 1 comprises means for allowing a user of the device 1 to control operation of the device 1, such as an on/off switch, a button for setting a quantity of juice to be produced by the device 1, etc. Also, in the interior of the pressing device 1, a waste receptacle 25 as indicated in FIG. 8 is present for receiving and accommodating remainders of oranges 2 which have been subjected to a pressing action, which may be designed such as to be a kind of drawer which is movably arranged in the housing 10, for example.

Basically, the operation of the pressing device 1 has the following aspects. In the first place, a user of the pressing device 1 takes care that a suitable number of oranges 2 is present in the holder 12, and that a glass 20 or another suitable receptacle is put in place under the outlet of the device 1, wherein the shape of the recessed portion 14 of the housing 10 guides the user in finding a correct position of the glass 20. In the second place, the user activates the pressing device 1, as a result of which a first orange 2 is allowed to enter the interior of the device 1 where the orange 2 is subjected to a pressing action, as a whole, i.e. without being cut in separate pieces first. During the pressing action, juice flows from the outlet of the pressing device 1. At the end of the pressing action, the remainder of the orange 2 is allowed to fall into the waste receptacle 25. The process may be repeated with as many oranges 2 as desired in order to have a desired quantity of juice.

From time to time, the user is supposed to remove the waste receptacle 25 from the pressing device 1 and to empty the waste receptacle 25, so that there is room for new remainders of oranges 2. Furthermore, the user can take out components as arranged in the interior of the pressing device 1 for cleaning purposes, by putting the lid 11 to the opened position.

In principle, the pressing device 1 is adapted to perform a pressing action on a whole orange 2 by positioning the orange 2 between two opposite surfaces and moving the surfaces towards each other. In order to have simplicity of design, it is preferred to only move one of the surfaces in the process, while another of the surfaces is kept at a fixed position. Furthermore, the pressing device 1 is adapted to make at least one cut in the orange 2 in order to have an outlet for the juice, through the peel of the orange 2, and in order to prevent ripping of the orange 2 during the pressing action, so that the sweet taste of the juice is not ruined by bitter oil which would otherwise be released from the skin and mix with the juice.

Figure 5:
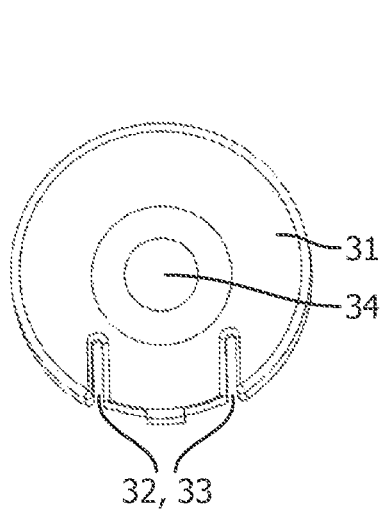
FIG. 5 shows a side view of one of the pressing elements.
Figure 6:
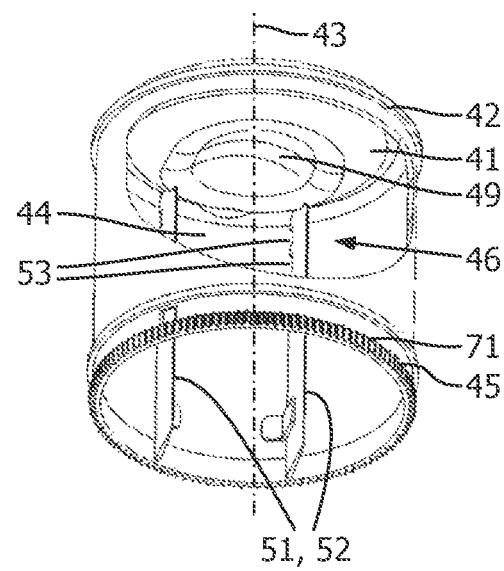
FIG. 6 shows a perspective view of another of the pressing elements.

The pressing device 1 comprises two pressing elements 30, 40 as can be seen in FIG. 3, comprising pressing surfaces 31, 41 for contacting an orange 2 at opposite sides and pressing the orange 2. One of the pressing elements 30, 40 is generally shaped like a disc, and is shown separately in FIG. 5. For sake of clarity, this pressing element will hereinafter be referred to as pressing disc 30. Another of the pressing elements 30, 40 is generally shaped like a hollow cylinder, and is shown separately in FIG. 6. For sake of clarity, this pressing element will hereinafter be referred to as pressing cylinder 40. The pressing surface 41 of the pressing cylinder 40 is a major part of an inner surface of a closed end 42 of the cylinder 40. The dimensions of the pressing disc 30 are chosen such that the disc 30 snugly fits inside the pressing cylinder 40, wherein an outer periphery of the disc 30 is closely surrounded by a portion of an inner surface of the cylinder 40. The pressing disc 30 is movable in a direction towards and away from the pressing surface 41 of the pressing cylinder 40, in a direction in which a longitudinal axis 43 of the cylinder 40 extends, wherein a major part of a surface of the disc 30 facing the pressing surface 41 of the cylinder 40 constitutes the pressing surface 31 of the disc 30. During a pressing action, only the pressing disc 30 is moved, while the pressing cylinder 40 is kept in a fixed position.

In the shown example, the pressing cylinder 40 is a straight cylinder, wherein a side of the cylinder has curved inner and outer surfaces with a circular cross-section. Hence, the outer periphery of the pressing disc 30 has a circular shape as well. In fact, the pressing disc 30 functions as a movable end of the pressing cylinder 40, as it were. The assembly of the pressing disc 30 and the pressing cylinder 40 define a generally cylinder-shaped pressing chamber 50 having a variable size due to the movable arrangement of the disc 30. In particular, the pressing surface 31 of the pressing disc 30 serves as one end surface of the pressing chamber 50, the pressing surface 41 of the pressing cylinder 40 serves as an opposite end surface of the pressing chamber 50, a side surface 44 of the pressing cylinder 40 serves as a side surface of the pressing chamber 50, and the longitudinal axis 43 of the pressing cylinder 40 serves as a longitudinal axis of the pressing chamber 50.

As mentioned in the foregoing, the pressing cylinder 40 has a closed end 42. Furthermore, the pressing cylinder 40 has an open end 45, in order to allow the pressing disc 30 to enter the cylinder 40 from outside the cylinder 40 and to allow driving means to engage with the disc 30 as will be explained later on. Also, an entrance opening 46 is present in the side of the pressing cylinder 40. The entrance opening 46 serves for allowing an orange 2 to move to inside the pressing cylinder 40 from the opening 13 in the housing 10 at the lowest end of the holder 12. Inside the pressing cylinder 40, at a position of the side of the cylinder 40 opposite to the entrance opening 46, two knives 51, 52 are arranged on the inner surface of the cylinder 40. Within the framework of the present invention, the number of knives 51, 52 does not necessarily need to be two, but may also be one, or three, for example. In the shown example, the knives 51, 52 comprise straight cutting blades, extending substantially in parallel in the direction in which the longitudinal axis 43 of the pressing cylinder 40 extends. The pressing disc 30 is provided with two recesses 32, 33 for allowing the pressing disc 30 to move over the knives 51, 52 during a pressing action or a retracting action.

Figure 7:
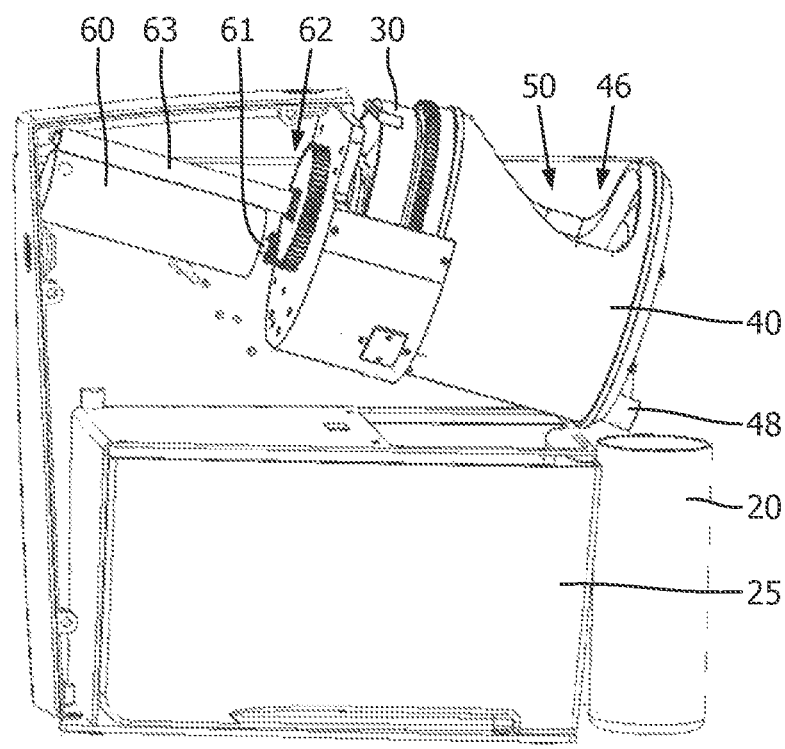
FIG. 7 diagrammatically shows a number of components of the pressing device, particularly the pressing elements and means for driving one of the pressing elements.

For the purpose of driving the pressing disc 30 and exerting a pressing force which is needed during a pressing action, the pressing device 1 comprises suitable driving means. In the shown example, the driving means comprise an electromotor 60 having an outgoing shaft 61, as can be seen in FIGS. 7 and 8. Furthermore, the driving means comprise a spindle drive 62. When the outgoing shaft 61 of the motor 60 rotates, a spindle 63 of the spindle drive 62 is extended or retracted. The pressing disc 30 is removably coupled to an end of the spindle 63, so that the disc 30 is moved deeper in the pressing cylinder 40 or refracted from the cylinder 40 under the influence of the motor 60. It will be understood that other types of driving means are feasible within the framework of the present invention, as long as the desired movements of the pressing disc 30 can be realized. FIG. 4 illustrates how a portion of the spindle 63 with a coupling arrangement 64 at an end thereof extends inside the interior of the pressing device 1 in one of the many possible positions of the spindle 63 in the device 1.

It is advantageous for the pressing cylinder 40 to be rotatable about its longitudinal axis 43, as in that way, it is possible to move the cylinder 40 between a position in which the entrance opening 46 in the side of the cylinder 40 is up, so that an orange 2 can be received inside the cylinder 40, and a position in which the entrance opening 46 is down, so that an orange 2 can be discharged to the waste receptacle 25, which is preferably arranged right underneath a space of the pressing device 1 for accommodating the pressing disc 30 and the pressing cylinder 40. Also, it is possible to move the pressing cylinder 40 to a position in which the entrance opening 46 is displaced somewhat with respect to the position in which the opening entrance 46 is up, so that a subsequent orange 2 from the holder 12 is prevented from entering the inside of the cylinder 40 and hindering the pressing action of an orange 2 which has just been admitted to the cylinder 40. As an alternative, it is possible to have separate means at the opening 13 in the housing 10 for blocking and unblocking the opening 13.

Various ways of driving the pressing cylinder 40 such as to perform a rotating movement are feasible within the framework of the present invention. In the shown example, the pressing cylinder 40 is provided with a gear ring 71 at its open end 45, wherein the pressing device 1 is equipped with a gear 72 for engaging with the gear ring 71 and an electromotor (not shown) for driving the gear 72, which is much smaller than the electromotor 60 for driving the pressing disc 30, as the pressing forces needed during a pressing action are much higher than the force which is needed for forcing the cylinder 40 to rotate.

During a pressing action of an orange 2, juice flows out of the orange 2 and flows over a portion of the side of the pressing cylinder 40, particularly a portion having a position at the bottom, which is a portion opposite to the entrance opening 46. Preferably, bases of the knives 51, 52 are provided with openings 53 in order to allow juice to pass to the lowest area of the pressing cylinder 40 as present between the knives 51, 52. FIGS. 7 and 8 clearly illustrate the fact that it is preferred to have an inclined position of the assembly of the pressing disc 30, the pressing cylinder 40 and the means for driving the disc 30 with respect to the horizontal, so that it is ensured that juice flows towards the closed end 42 of the cylinder 40. At the position where the closed end 42 is connected to the lowest area of the pressing cylinder 40, a discharge opening 47 and a discharge tube 48 connected to the cylinder 40 at the position of the discharge opening 47 are provided. For sake of completeness, it is noted that a default position of the pressing cylinder 40 for the purpose of a pressing action is assumed, i.e. a position as shown in the various figures, with the entrance opening 46 up, unless otherwise indicated. A coarse filter, a constriction or the like may be arranged in the discharge opening 47 for stopping possible pips from flowing along with the juice towards the glass 20. When the pressing cylinder 40 is rotated at the end of a pressing action for discharging the remainder of the orange 2 to the waste receptacle 25, it is achieved that the pips fall to the waste receptacle 25 as well.

Figure 9:
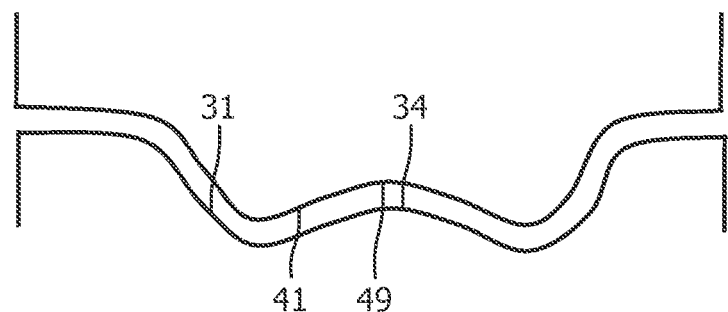
FIG. 9 diagrammatically shows a sectional view of complementary curved surfaces of the pressing elements.

With reference to FIG. 9, it is noted that the pressing surfaces 31, 41 have special shapes which are aimed at preventing ripping of the peel of an orange 2 to be pressed. FIG. 9 shows a side view of central sections through the pressing surfaces 31, 41, in which it can be seen that the pressing surfaces 31, 41 have complementary curved shapes. In particular, the pressing surface 31 of the pressing disc 30 has a generally concave shape, with a convex central portion 34, whereas the pressing surface 41 of the pressing cylinder 40 has a generally convex shape, with a concave central portion 49. It will be understood that in principle, it is also possible for the pressing surface 31 of the pressing disc 30 to have a generally convex shape, with a concave central portion, and for the pressing surface 41 of the pressing cylinder 40 to have a generally concave shape, with a convex central portion. Furthermore, the pressing surfaces 31, 41 may simply have shapes which are overall concave and overall convex, respectively, but it is preferred to have the central portions 34, 49 with the inverse shapes, as it has been found that the presence of such portions 34, 49 help in preventing even thick peels from ripping, due to a reducing effect on a curve length difference between two opposite sides of an orange 2 to be pressed.

When the pressing device 1 is used for making juice, an orange 2 to be pressed in the process follows a path through the device 1 and is subjected to a pressing action in a way as will be explained in the following. In the first place, the orange 2 is allowed to fall to the inside of the pressing cylinder 40 through the opening 13 in the housing 10 at the lowest end of the holder 12 and the entrance opening 46 of the cylinder 40. This is done by having the pressing disc 30 in a retracted position and having the pressing cylinder 40 in a position with the entrance opening 46 up, so that there is a free passage for the orange 2. As soon as the orange 2 is in place in the pressing cylinder 40, the opening 13 in the housing 10 may be blocked, so that a subsequent orange 2 is prevented from directly following the orange 2.

When the orange 2 falls into the pressing cylinder 40, the orange 2 comes to rest on the knives 51, 52. Probably, the knives 51, 52 already cut through the peel of the orange 2 and some of the pulp of the orange 2 in the process. If not, the cutting action will take place during the pressing action, when the orange 2 is pressed between the pressing surfaces 31, 41 and is thereby made to expand in the direction of the knives 51, 52.

When the orange 2 is in place in the pressing cylinder 40, the electromotor 60 for driving the pressing disc 30 through the spindle drive 62 is activated, as a result of which the pressing disc 30 is moved in the direction of the closed end 42 of the cylinder 40. As soon as the pressing disc 30 contacts the orange 2, the actual pressing action starts, wherein the orange 2 is squeezed between the pressing surface 31 of the disc 30 on the one side and the pressing surface 41 of the pressing cylinder 40 on the other side as the movement of the disc 30 is continued. In the process, two cuts are made at a bottom side of the orange 2, if this has not already happened when the orange 2 entered the pressing cylinder 40, as explained in the foregoing. The fact is that the orange 2 is deformed as a result of the pressing action, wherein the orange 2 expands in the direction of the knives 51, 52, so that the orange 2 is pressed on the knives 51, 52, as it were, under the influence of the pressing forces prevailing during the pressing action.

The fact that the orange 2 is deformed is one effect of the pressing action. Another effect of the pressing action is the fact that juice is extracted from the orange 2, wherein the cuts in the orange 2 serve as outlets through the peel of the orange 2. As the knives 51, 52 are positioned at a bottom of the pressing cylinder 40, it is achieved that the juice can fall directly from the orange 2 to the inner surface of the pressing cylinder 40, so that the juice is prevented from flowing over the peel. Contact between the juice and the peel is minimized in order to guarantee an unspoiled taste of the juice. The juice only contacts the peel at the position of the cuts, which can do no harm to the taste of the juice. During the pressing action, the juice which is released from the orange 2 flows directly towards the glass 20 under the influence of gravity, along the inner surface of the pressing cylinder 40 and through the discharge opening 47 of the cylinder 40 and the discharge tube 48.

As explained in the foregoing, the shapes of the pressing surfaces 31, 41 play a role in preventing the peel of the orange 2 from ripping during the pressing process. The peel is known to have some elasticity, and by controlling the way in which the peel is cut and deformed, a situation is created in which the forces acting in the peel are not so high as to cause the peel to rip at one or more places. If, despite of all the measures taken, the peel rips anyway, this is likely to occur only near the end of a pressing action when deformation of the orange 2 and its peel is largest, when all the juice has already been removed from the orange 2 and there is no risk that oil from the peel is flushed from the peel along with juice.

When the pressing disc 30 is at a close enough distance to the closed end 42 of the pressing cylinder 40, the operation of the electromotor 60 is reversed, as a result of which the pressing disc 30 is refracted. When the pressing disc 30 has been moved out of the pressing cylinder 40, the cylinder 40 is made to rotate about its longitudinal axis 43, in order to put the cylinder 40 to a position in which the entrance opening 46 is at a bottom side, so that the deformed remainder of the orange 2 is allowed to slide off the knives 51, 52 and fall to the waste receptacle 25, through the entrance opening 46. Optionally, the pressing device 1 may comprise means for pushing the orange 2 in a downward direction such as to guarantee that the orange 2 is released from the knives 51, 52.

Advantageously, the pressing disc 30 can easily be detached from the spindle 63, so that the pressing disc 30 can easily be removed from the pressing device 1. For example, a coupling between the pressing disc 30 and the spindle 63 may simply be a coupling in which the pressing disc 30 is suspended from the spindle 63 on the basis of gravity. Hence, it is only necessary to lift the pressing disc 30 from its position when it is desired to remove the disc 30. Furthermore, the pressing cylinder 40 may be supported by a surface of the interior of the pressing device 1 without any attachment to the surface, so that the cylinder 40 can easily be taken out of the device 1 when desired. Easy removal of the pressing disc 30 and the pressing cylinder 40 is advantageous in view of cleaning purposes. The pressing disc 30 and the pressing cylinder 40 only need to be rinsed. The pressing action as performed with the pressing device 1 is a relatively clean action in view of the fact that the pulp stays inside the oranges 2.

A factor which contributes to simplicity of design of the pressing device 1 is constituted by the fact that oranges 2 are pressed as a whole, so that there is no need for having means for cutting the oranges 2 into segments, transporting the segments, etc. Also, the pulp of the orange 2 stays inside the orange 2, so that filtration of the juice by a sieve or the like is not required. During a pressing action, at least one cut is made in the orange 2 in an automated fashion by means of at least one fixedly arranged knife 51, 52, so that complex cutting movements can be avoided. Furthermore, oranges 2 to be pressed automatically follow a path through the pressing device 1 under the influence of gravity, from the holder 12 which is present on top of the pressing device 1 to the waste receptacle 25 after having been subjected to a pressing action. Juice also flows automatically from the oranges 2 to a receptacle such as a glass 20 under the influence of gravity.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

The pressing disc 30 and the pressing cylinder 40 as shown are to be understood as just being examples of mutually movable pressing elements of the citrus fruit pressing device 1 according to the present invention. Aspects like the holder 12 and the recessed portion 14 of the housing 10 are not related to the basic concept of the present invention and may be omitted or replaced by alternatives. The cylinder shape of the pressing chamber 50 does not necessarily need to have a circular circumference; other shapes of the circumference are feasible as well within the framework of the present invention.

The present invention is very well suitable to be applied in a domestic environment, as explained in the foregoing. The pressing device 1 according to the invention may be equipped with means for driving the pressing disc 30 as explained in the foregoing, but it is also possible for the device 1 to be hand-driven within the framework of the present invention. In such as case, a lever construction or the like can be used for allowing a user to manipulate the pressing disc 30 and to provide the necessary forces at the location where the pressing action takes place. Another possible application of the present invention is an application in an industrial environment, wherein the pressing device 1 may be adapted to different sizes of pieces of citrus fruit. In this respect, it is noted that the present invention does not only relate to a citrus fruit pressing device 1, but also relates to a method for pressing juice from a piece of citrus fruit 2.

In particular, according to the present invention, a method for pressing juice from a piece of citrus fruit 2 comprises the steps of providing two opposite pressing surfaces 31, 41 which are movable towards each other and away from each other, arranging the piece 2 between the pressing surfaces 31, 41, making at least one cut in the piece 2, through the peel of the piece 2, in an area of the piece 2 which is free from contact to the pressing surfaces 31, 41, and pressing the piece 2 as a whole by moving the pressing surfaces 31, 41 towards each other. As explained in the foregoing, at least one cut is made in the piece of citrus fruit 2 in order to allow the juice to come out of the piece and reduce tensions in the peel of the piece 2 during deformation, wherein the cut is made in another area than the areas contacting the pressing surfaces 31, 41, as a result of which ripping of the peel is avoided, because tensions prevailing in the peel during a pressing action are reduced.

Preferably, the cut is made in the piece 2 at a side of the piece 2 which is a bottom side in the arrangement of the piece 2 between the pressing surfaces 31, 41. In that way, besides the advantageous fact that ripping of the peel, which would otherwise cause bitter oil to be released and mix with the juice, is avoided, it is achieved that contact between the juice and the peel is minimized, as explained earlier.

Advantageously, at least one knife 51, 52 is applied for making the at least one cut in the piece of citrus fruit 2, wherein contact between the knife 51, 52 and the piece 2 is maintained as the piece 2 is pressed, and wherein the knife 51, 52 is kept at a location to which the piece 2 expands as a result of its deformation. Furthermore, it is practical to provide a pressing element 40 which comprises one of the pressing surfaces 31, 41 and an opening 46 for allowing the piece of citrus fruit 2 to pass from outside the pressing element 40 to inside the pressing element 40. In that case, the piece 2 is supplied to the pressing element 40, wherein the piece 2 is held in the pressing element 40 as the piece 2 is pressed, and wherein the pressing element 40 is rotated after pressing has taken place in order to bring its opening 46 to a bottom position for allowing the piece 2 to fall out of the pressing element 40 under the influence of gravity. Hence, the piece 2 can simply be allowed to fall to a suitable waste receptacle 25 without a need of applying separate means for discharging the piece 2 from the pressing element 40.

The present invention can be summarized as follows. A citrus fruit pressing device 1 comprises two pressing elements 30, 40 for performing a pressing action on a piece of citrus fruit 2, which pressing elements 30, 40 have surfaces 31, 41 for contacting different sides of a piece of citrus fruit 2 to be pressed, and which pressing elements 30, 40 are movable with respect to each other in two opposite directions, i.e. towards each other and away from each other. Furthermore, the pressing device 1 comprises cutting means for performing a cutting action on a piece of citrus fruit 2, through the peel of the piece 2, which cutting means are arranged for penetrating into the piece 2 from a side which is free from contact to the surfaces 31, 41 of the pressing elements 30, 40.

In a practical embodiment, the citrus fruit pressing device 1 comprises a generally cylinder-shaped pressing chamber 50 having an interior space for receiving a piece of citrus fruit 2 to be pressed, which pressing chamber is partially delimited by the surfaces 31, 41 of the pressing elements 30, 40. In particular, the surface 31 of one pressing element 30 constitutes one end surface 31 of the pressing chamber 50, and the surface 41 of another pressing element 40 constitutes an opposite end surface 41 of the pressing chamber 50. The size of the pressing chamber 50 is changed by moving the pressing elements 30, 40 with respect to each other, wherein a piece of citrus fruit 2 is squeezed between the surfaces 31, 41 of the pressing elements 30, 40 as the surfaces 31, 41 are made to move towards each other. Furthermore, the cutting means are adapted to perform a cutting action on a piece of citrus fruit 2 inside the pressing chamber 50, and therefore comprise at least one knife 51, 52 which is arranged inside the pressing chamber 50 on a side surface 44 of the pressing chamber 50.

On the basis of the application of the pressing elements 30, 40 and the at least one knife 51, 52 in the citrus fruit pressing device 1, a compact and simple design of the pressing device 1 can be realized, so that the pressing device 1 can be operated in a reliable manner. Also, by having at least one knife 51, 52 arranged at a side position with respect to the surfaces 31, 41 which serve as pressing surfaces during a pressing action, at least one defined cut is made in a piece of citrus fruit 2 to be pressed, which does not only have a function in allowing juice to flow from the piece 2, but also in preventing the peel of the piece 2 from ripping, so that the sweet taste of the juice which is obtained from the piece 2 is preserved.

The invention claimed is:

1. A citrus fruit pressing device, comprising:
two pressing elements for performing a pressing action on a piece of citrus fruit, which pressing elements have surfaces for contacting different sides of a piece of citrus fruit to be pressed, and which pressing elements are movable with respect to each other in two opposite directions, towards each other and away from each other;
cutting means for performing a cutting action on a piece of citrus fruit, through the peel of the piece, which cutting means are arranged for penetrating into the piece from a side which is free from contact to the surfaces of the pressing elements; and
a generally cylinder-shaped pressing chamber having an interior space for receiving a piece of citrus fruit to be pressed;
wherein the cutting means comprise at least one knife which is arranged inside the pressing chamber on a side surface of the pressing chamber;
wherein the pressing chamber is partially delimited by the surfaces of the pressing elements, wherein the surface of one pressing element constitutes one end surface of the pressing chamber, wherein the surface of another pressing element comprises an opposite end surface of the pressing chamber,
wherein one of the pressing elements has an opening for allowing a piece of citrus fruit to pass from outside the pressing element to inside the pressing chamber and vice versa, and wherein the pressing element is rotatably arranged in the device.

2. The citrus fruit pressing device according to claim 1, wherein the cutting means are located at a side of the pressing chamber which is a bottom side in an operational orientation of the device.

3. The citrus fruit pressing device according to claim 1, wherein the at least one knife of the cutting means comprises a straight cutting blade.

4. The citrus fruit pressing device according to claim 3, wherein the cutting blade of the knife extends in a direction which is substantially the same as the directions in which the pressing elements are movable with respect to each other.

5. The citrus fruit pressing device according to claim 4, wherein at least one of the pressing elements comprises at least one recess for allowing the pressing element to move over the knife.

6. The citrus fruit pressing device according to claim 1, wherein a position of one of the pressing elements is fixed in the directions in which the pressing elements are movable with respect to each other, and wherein the surface on which the at least one knife of the cutting means is arranged is part of that one of the pressing elements.

7. The citrus fruit pressing device according to claim 1, wherein the pressing element is rotatable about an axis extending in a direction which is substantially the same as the directions in which the pressing elements are movable with respect to each other.

8. The citrus fruit pressing device according to claim 1, wherein a surface of the pressing chamber which is at a side of the pressing chamber which is a bottom side in an operational orientation of the device has an inclined orientation with respect to the horizontal in the operational orientation of the device.

9. The citrus fruit pressing device according to claim 1, wherein one of the end surfaces of the pressing chamber has a generally convex shape, with a concave central portion, and wherein another of the end surfaces of the pressing chamber has a generally concave shape, with a convex central portion.

10. A method for pressing juice from a piece of citrus fruit, wherein two opposite pressing surfaces which are movable towards each other and away from each other are provided, wherein the piece is arranged between the pressing surfaces, wherein at least one cut is made in the piece, through the peel of the piece, in an area of the piece which is free from contact to the pressing surfaces, and wherein the piece is pressed as a whole by moving the pressing surfaces towards each other; and
wherein a pressing element which comprises one of the pressing surfaces and an opening for allowing the piece of citrus fruit to pass from outside the pressing element to inside the pressing element is provided, wherein the piece is supplied to the pressing element, wherein the piece is held in the pressing element as the piece is pressed, and wherein the pressing element is rotated after pressing has taken place in order to bring its opening to a bottom position for allowing the piece to fall out of the pressing element under the influence of gravity.

11. The method according to claim 10, wherein the cut is made in the piece at a side of the piece which is a bottom side in the arrangement of the piece between the pressing surfaces.

12. The method according to claim 10, wherein at least one knife is applied for making the at least one cut in the piece of citrus fruit, wherein contact between the knife and the piece is maintained as the piece is pressed, and wherein the knife is kept at a location to which the piece expands as a result of its deformation.

* * * * *